(12) United States Patent
Menke et al.

(10) Patent No.: US 8,430,235 B2
(45) Date of Patent: Apr. 30, 2013

(54) MODULAR CONVEYOR MAT AND CONVEYOR MAT MODULE

(75) Inventors: Cornelis Hendrik Mijndert Menke, Den Haag (NL); Gijsbertus Johannes Verduyn, Terheijden (NL)

(73) Assignee: Rexnord Flattop Europe B.V. (NL)

( * ) Notice: Subject to any disclaimer, the term of this patent is extended or adjusted under 35 U.S.C. 154(b) by 378 days.

(21) Appl. No.: 12/096,136

(22) PCT Filed: Dec. 8, 2006

(86) PCT No.: PCT/NL2006/000626
§ 371 (c)(1),
(2), (4) Date: Oct. 9, 2008

(87) PCT Pub. No.: WO2007/067047
PCT Pub. Date: Jun. 14, 2007

(65) Prior Publication Data
US 2009/0218200 A1    Sep. 3, 2009

(30) Foreign Application Priority Data

Dec. 8, 2005 (NL) ..................................... 1030625

(51) Int. Cl.
*B65G 17/06* (2006.01)
(52) U.S. Cl.
USPC .......................................... 198/853; 198/850
(58) Field of Classification Search .................. 198/850, 198/851, 853
See application file for complete search history.

(56) References Cited

U.S. PATENT DOCUMENTS

| | | | | |
|---|---|---|---|---|
| 1,136,578 | A | * | 4/1915 | Ayres .............................. 198/853 |
| 2,141,876 | A | * | 12/1938 | Perkins ......................... 198/600 |
| 2,446,936 | A | | 8/1948 | Leithmann, Jr. et al. |
| 3,944,059 | A | | 3/1976 | Garvey |
| 4,611,710 | A | | 9/1986 | Mitsufuji |
| 4,676,368 | A | * | 6/1987 | Damkjar ........................ 198/852 |
| 5,137,144 | A | * | 8/1992 | Uehara .......................... 198/822 |
| 5,197,591 | A | | 3/1993 | Roinestad et al. |
| 5,439,097 | A | * | 8/1995 | Takahashi et al. ........ 198/867.01 |
| 6,193,056 | B1 | * | 2/2001 | van Zijderveld et al. ..... 198/853 |
| 6,615,979 | B2 | | 9/2003 | Etherington et al. |
| 7,222,730 | B2 | * | 5/2007 | Garbagnati et al. .......... 198/853 |
| 7,267,221 | B2 | * | 9/2007 | Hall ............................... 198/853 |

FOREIGN PATENT DOCUMENTS

| | | |
|---|---|---|
| DE | 42 36 461 A1 | 5/1993 |
| EP | 0 930 247 A | 7/1999 |

OTHER PUBLICATIONS

International Search Report and Written Opinion in connection with PCT/NL2006/000626, with a mailing date of Mar. 16, 2007.

* cited by examiner

*Primary Examiner* — Gene Crawford
*Assistant Examiner* — William R Harp
(74) *Attorney, Agent, or Firm* — Quarles & Brady LLP

(57) ABSTRACT

A module for a modular conveyor mat includes a substantially flat metal body part having front and rear sides extending transversely to a conveying direction (P). Projections spaced apart by intermediate spaces form hinge loops attached to the body part. A plastic cover forming a conveying surface is attached to the body part and extends over and around at least one of the hinge loops. The invention also relates to a modular conveyor mat, comprising a multiple number of the modules.

26 Claims, 5 Drawing Sheets

MODULAR CONVEYOR MAT AND CONVEYOR MAT MODULE

CROSS REFERENCE TO RELATED APPLICATION

This application is a U.S. national phase of PCT Application No. PCT/NL2006/000626 filed on Dec. 8, 2006, which claims priority to Dutch Patent Application No. 1030625 filed Dec. 8, 2005.

STATEMENT REGARDING FEDERALLY SPONSORED RESEARCH OR DEVELOPMENT

Not applicable.

BACKGROUND OF THE INVENTION

The invention relates to a modular conveyor mat and a conveying module for a modular conveyor mat. Modular conveyor mats are generally known and are used for conveying all sorts of products in a large number of environments. A particularly demanding use for a modular conveyor mat is the conveyance of products through a pasteurizer or a cooler.

An example of this is a tunnel pasteurizer or a tunnel cooler, in which the modular conveyor mat passes through a housing. In the housing, a number of zones are realized in which the temperature of the products to be conveyed can be influenced with heat exchanging medium. An example is a beer can or beer bottle to be pasteurized which is passed, with the aid of the modular conveyor mat, through a number of temperature zones within the housing, in which hot water is sprayed on the bottle with each time, per zone, a different temperature, for instance 40-60-40-20° C. In such a tunnel pasteurizer or tunnel cooler, the modular conveyor mat can, for instance, be 6.5 meters wide and up to 40 meters long. Such a conveyor conveys the products at a velocity of for instance approximately 0.5-1 m/min and can have a capacity of, for instance, approximately 70,000 beer bottles an hour. In the water zones, per $m^2$ of track surface, approximately 25 $m^3$ of water is sprayed per hour on the beer bottles. Fox a more efficient use of water, within the housing, two conveyors can be arranged one above the other.

On account of their favourable cost price and light weight, as a rule, it is preferred to use plastic modules in modular conveyor mats. However, for some uses, for instance with heavily loaded tunnel pasteurizers, it has been proposed to provide a hybrid conveyor mat. In such a hybrid conveyor mat, an endless base structure composed of metal modules is used, which is provided with plastic product carriers forming the conveying surface.

Here, the base structure of the conveyor mat is of modular design from metal elements, which absorb the tensile forces that are formed upon conveyance, and which are, furthermore, form-retaining and wear resistant and resistant to aging. The plastic product carriers facilitate handling the products, for instance during transfer from or to a different conveyor. As they do not form part of the base structure, the form stability and wear resistance of the product carrier is less critical, so that designing them in plastic is well possible. Examples of such hybrid conveyor mats are described in, for instance, U.S. Pat. No. 5,197,591 and U.S. Pat. No. 6,615,979 in the name of Ashworth.

A drawback of the known hybrid conveyor mats is that often, they are still not sufficiently strong.

BRIEF SUMMARY OF THE INVENTION

The invention contemplates a modular conveyor mat and a module therefore with a high tensile strength, and, in particular, a conveyor mat which is of simple construction and which can run on a conventional track. To that end, the invention provides a module for a modular conveyor mat, comprising a substantially flat, sheet metal body part provided on front sides and rear sides extending transversely to a conveying direction with projections spaced apart by intermediate spaces and which form hinge loops, and, attached to the body part, a plastic cover which forms a conveying surface. Through the provision of a sheet metal body part on which a plastic covered is attached, a very great tensile strength can be obtained with a simple construction.

As the body parts of the modules form a hinge belt, a great force can be transmitted while with the aid of the plastic cover geared to the modules, a good product supporting surface can be realized. Preferably, the cover defines a conveying surface that is provided with a multiple number of parallel grooves extending in conveying direction with supporting strips located therebetween. Here, the grooves can cooperate with fingers of a transferring device for placing products on the conveying surface or taking them therefrom.

Preferably, the cover substantially covers the body part. In particular, the cover can extend, in conveying direction, beyond the hinge loops. As a result, the cooperation with fingers of a transferring device can be improved.

By providing the body part and/or the cover with drain openings, drainage of liquid through the conveyor mat can be facilitated.

Placing the cover fixedly positioned on the body part can avoid the formation of stresses caused by temperature fluctuations due to the different expansion coefficients of body part and cover. A central part of the cover, for instance the middle, is elegantly connected to the cover so as to be secured against translation. As a result, the cover can freely expand or shrink from the central part secured against translation.

Such securing against translation may be carried out by connecting the cover to the body part via one or more positioning pins. Another option is securing against translation by means of stop edges.

By connecting the cover to the body part via one or more snap connections, designed as, for instance, snap fingers, a connection can be effected that can compensate for thermal length change and that can furthermore be secured relatively simply. Further, if desired, the cover can be detached relatively easily with the aid of the snap connection.

In particular, it is advantageous when the cover engages the body part and is free of cooperation with the hinge pins. What can thus be achieved is that a module formed from one body part and one or more covers, forms a separate unit, thereby simplifying the composition of the mat. As the cover cooperates only with the body part and not with the hinge pins, the cover can simply be replaced without disassembling the conveyor mat.

By providing the module transversely to the conveying direction with a multiple number of covers, the influence of thermal length change of the covers transversely to the conveying direction can be minimized.

Preferably, at a starting temperature, for instance room temperature, the covers are included on the body part with some intermediate space relative to each other. Further, adjacent the side edges, transversely to the conveying direction, some intermediate space is left open between the side edge of the cover and the side edge of the body part.

The invention also relates to a modular conveyor mat, comprising a multiple number of modules, successive in conveying direction and extending transversely to the conveying direction, having a sheet metal body part which is provided on front sides and rear sides extending transversely to the conveying direction with projections spaced apart by an intermediate space and forming the hinge loops, and, attached to the body part, a cover forming a conveying surface, wherein the hinge loops of the modules successive in conveying direction cooperate and are coupled with the aid of hinge pins proceeding transversely to the conveying direction, while the upper sides of the covers cooperate for forming a conveying surface.

Here, preferably, the hinge pins extend uninterruptedly over the width of the conveyor mat. What can thus be achieved is that the mat formed with the pins and modules has a good coherence while, nevertheless, the width of the modules transversely to the conveying direction can be considerably smaller than the width of the conveyor mat.

Hence, the conveyor mat can be built up, transversely to the conveying direction, from only one module, but can also be built up, transversely to the conveying direction, from several modules side by side which are borne by mutual hinge pins. In conveying direction, the modules are then aligned in rows.

However, by having rows of modules successive in conveying direction stagger relative to each other transversely to the conveying direction, according to a brick pattern, the coherence of the conveyor mat can be increased. When a body part bears a multiple number of covers, it is preferred that here, the covers are aligned in rows. This can be realized, for instance, by having successive rows of body parts stagger transverse to the conveying direction over a distance that corresponds with the width of one cover transversely to the conveying direction, or a natural multiple of this width.

It is noted that it is also possible to assemble a conveyor, with the aid of the modules, with which a multiple number of modular mats running parallel to each other travel on joint axes, so that the conveyor comprises a number of parallel, side-by-side modular mats.

Optionally, the conveyor mat can cooperate with the conveyor track with a straight guide, preferably a single straight guide per conveyor mat which, preferably, runs along the middle. Such a straight guide can for instance be designed as guiding cams under the mat that cooperate with a guide strip in the guide track. Such a straight guide is described in, for instance, NL 1010042.

It is further noted that, if desired, between cooperating hinge loops of successive modules, an intermediate space can be created for including supporting rollers on the hinge pins for cooperation with a conveyor track. Naturally, such rollers can also be borne by the modules or by the conveyor track. In the latter case, the wear strips for instance, can be provided with supporting rollers.

BRIEF DESCRIPTION OF THE SEVERAL VIEWS OF THE DRAWINGS

The invention will be further elucidated on the basis of an exemplary embodiment represented in a drawing. In the drawings.

DETAILED DESCRIPTION OF THE EXAMPLE EMBODIMENTS

Figure 1:
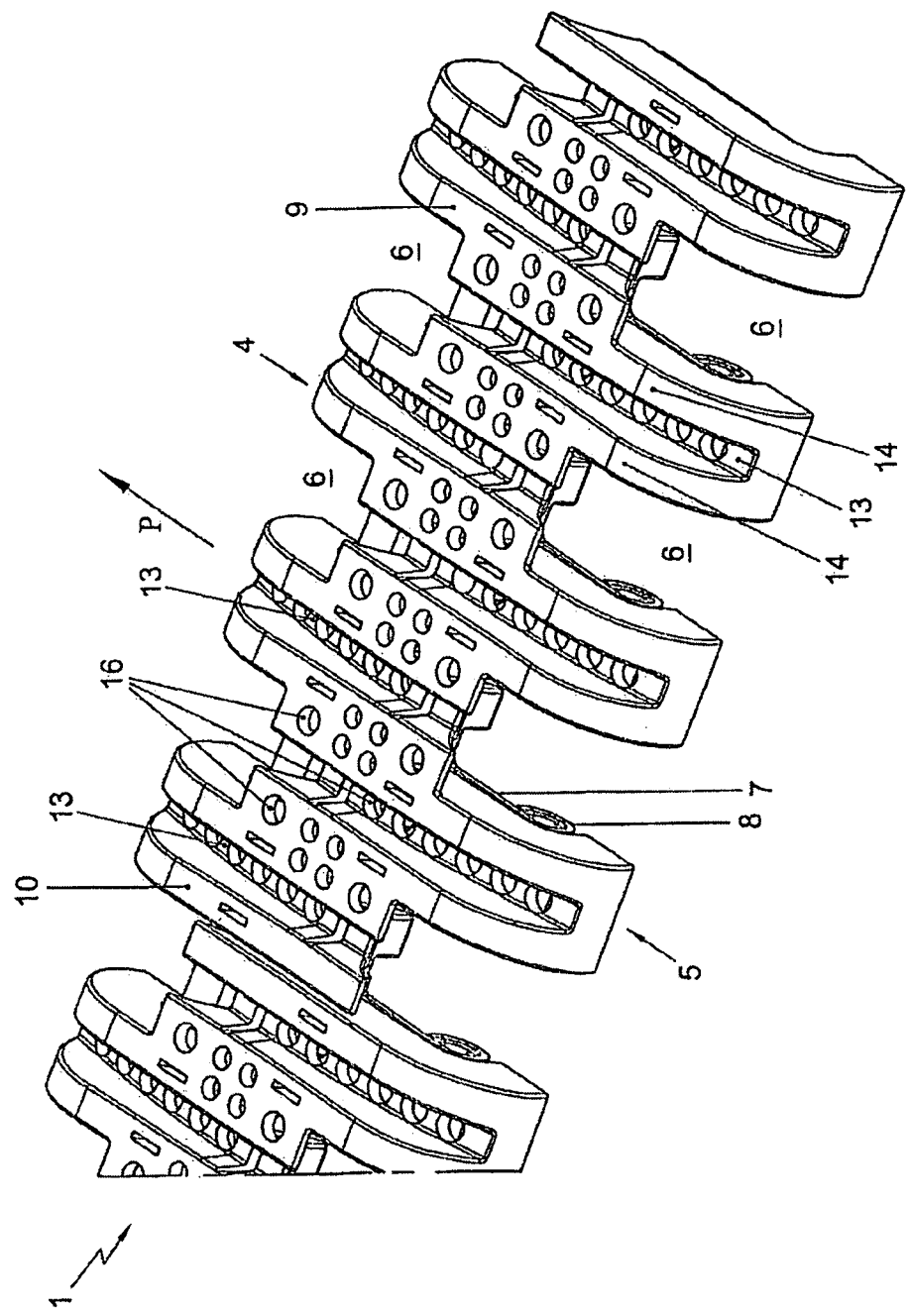
FIG. 1 shows a schematic, perspective top plan of a conveying module according to the invention.
Figure 2:
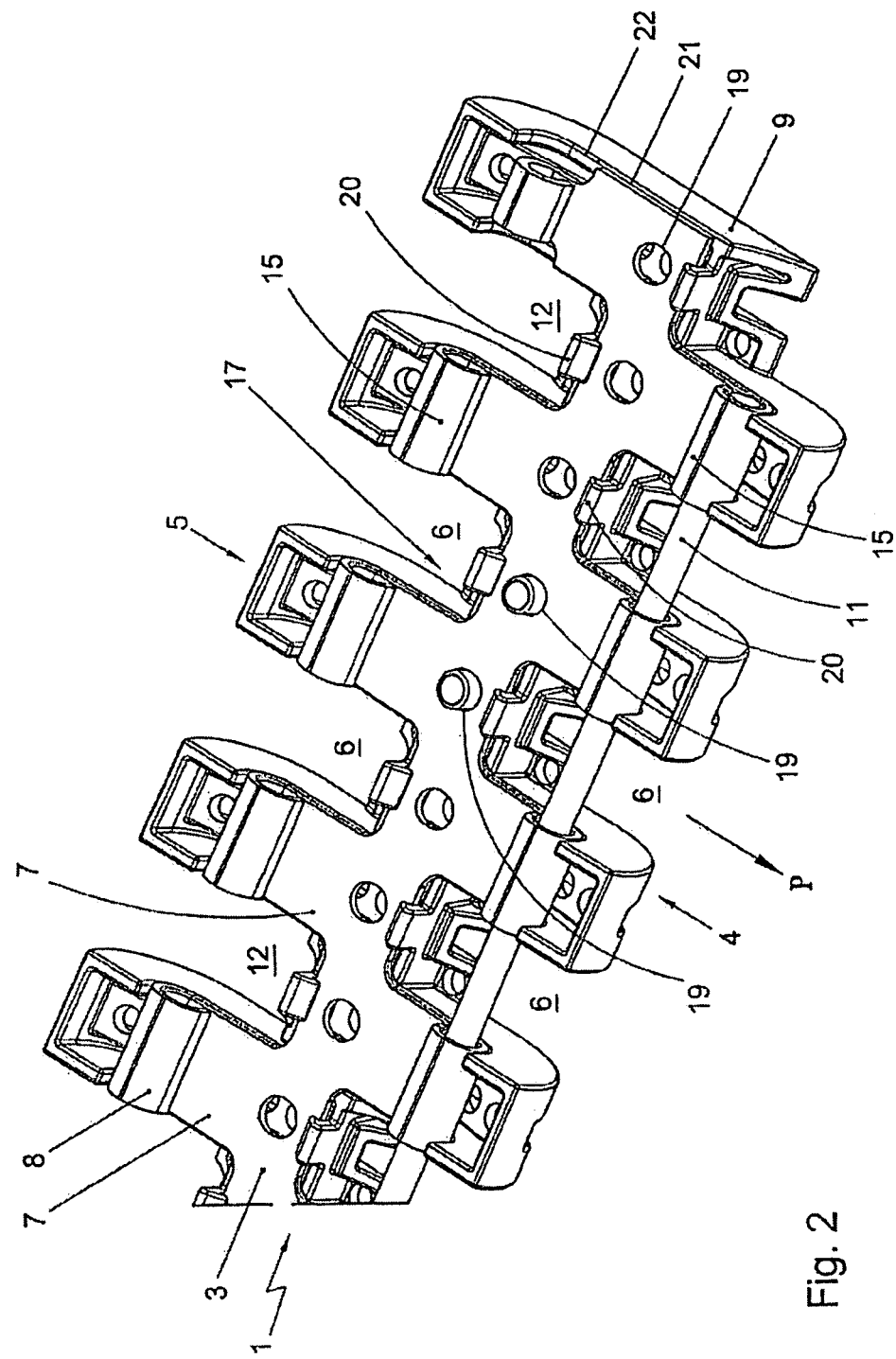
FIG. 2 shows a schematic, perspective bottom view of the conveying module of FIG. 1.
Figure 3:
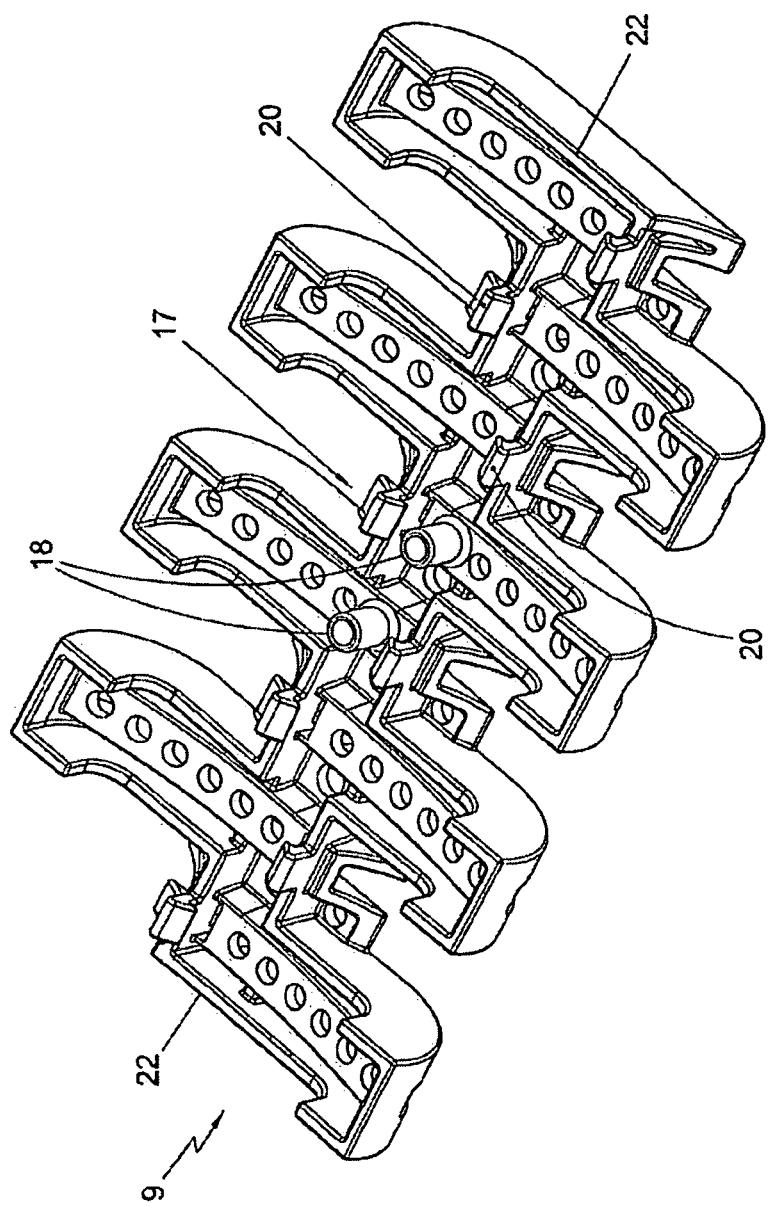
FIG. 3 shows a schematic, perspective view of the bottom side of a cover of the module of FIG. 1.
Figure 4:
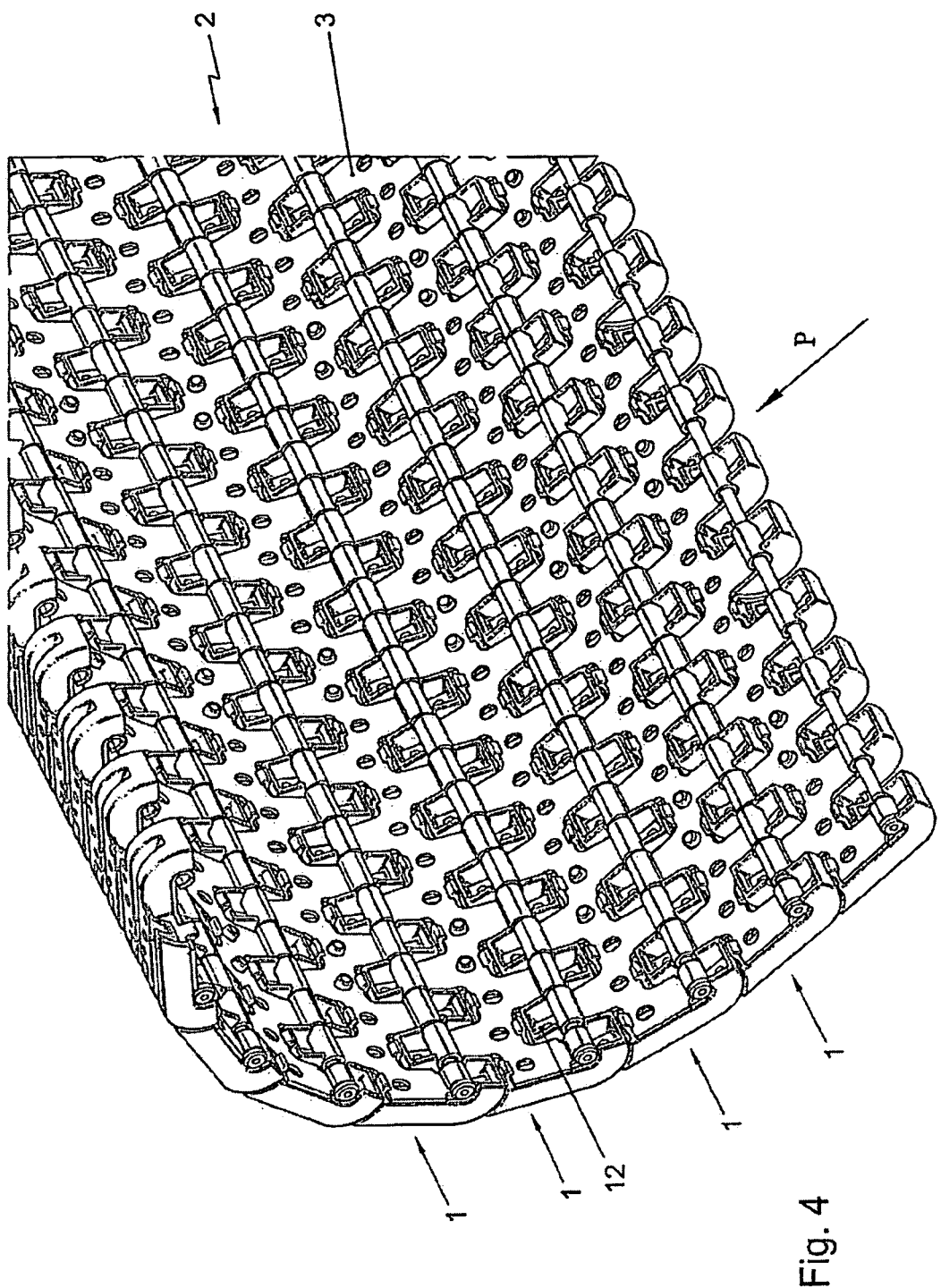
FIG. 4 shows a schematic, perspective bottom view of a segment of a modular conveyor mat composed with the modules of FIG. 1, upon negotiation of a bend transverse to the conveying surface.

The Figures are only schematic representations of a preferred embodiment of the invention and are given by way of non-(imitative exemplary embodiment. In the Figures, identical parts are indicated with identical reference numerals.

With reference to FIGS. 1-4, a module 1 is shown for a modular conveyor mat 2. The module 1 comprises a sheet metal body part 3. The body part 3 is flat. The body part 3 is provided, on the front side 4 and rear side 5 extending transversely to a conveying direction indicated with an arrow P, with projections 7, spaced apart by intermediate spaces 6.

The projections 7 form hinge loops 8. The module 1 further comprises, attached to the body part 3, a plastic cover 9 forming a conveying surface 10.

The body part 3 of the module is of horizontal orientation and of substantially flat design. Preferably, it has been punched from steel plate. In this exemplary embodiment, the hinge loops at the front side 4 and the rear side 5 are designed so as to be mutually staggered relative to each other transverse to the conveying direction P. As a result, in the intermediate space 6 between two hinge loops 8 on a front side 4 of the module 1, can be included a hinge loop 8 on a rear side 5 of a module 1 successive in conveying direction P. The thus cooperating hinge loops 8 of successive modules 1 can be coupled with the aid of a hinge pin 11. Transversely to the conveying direction, at least a number of successive, cooperating hinge loops link up with each other, so that a sort of piano hinge is formed.

In this exemplary embodiment, the hinge loops 8 are formed through curling of the ends of the projections 7. Here, the projections 7 are designed to be longer in the conveying direction than the curled portion, so that with the aid of recesses in the body part between the projections 7, with the modules in coupled condition, between a hinge loop 8 and a body part 3 of a successive module, a hole is formed that may function as drain opening 12 for drainage of liquid through the module 1 of the conveyor mat 2.

It will be clear that the body part 3 can also be of completely closed design, or, in addition to or instead of recesses, may be provided with perforations. Further, the length of a projection 7 in conveying direction can be chosen to be substantially equal to the length required for forming a hinge loop 8.

In this exemplary embodiment, the hinge loops 8 are located under the body part 3. It will however be clear that the hinge loops can also be located, at the same height as the body part 3, or, conversely, be located thereabove. Further, transversely to the conveying direction P, between the hinge loops 8 of successive modules 1, there is some clearance. If desired, a larger intermediate space can be created here, for including, for instance, a construction element borne by the hinge pin 11, such, as, for instance, a supporting wheel or a roller.

The cover 9 is manufactured from plastic material, preferably a relatively form-retaining plastic material that is typically used for manufacturing plastic mat modules, such as PE, PP, PA and POM. Preferably, the cover 9 is manufactured by means of injection molding.

Figure 5:
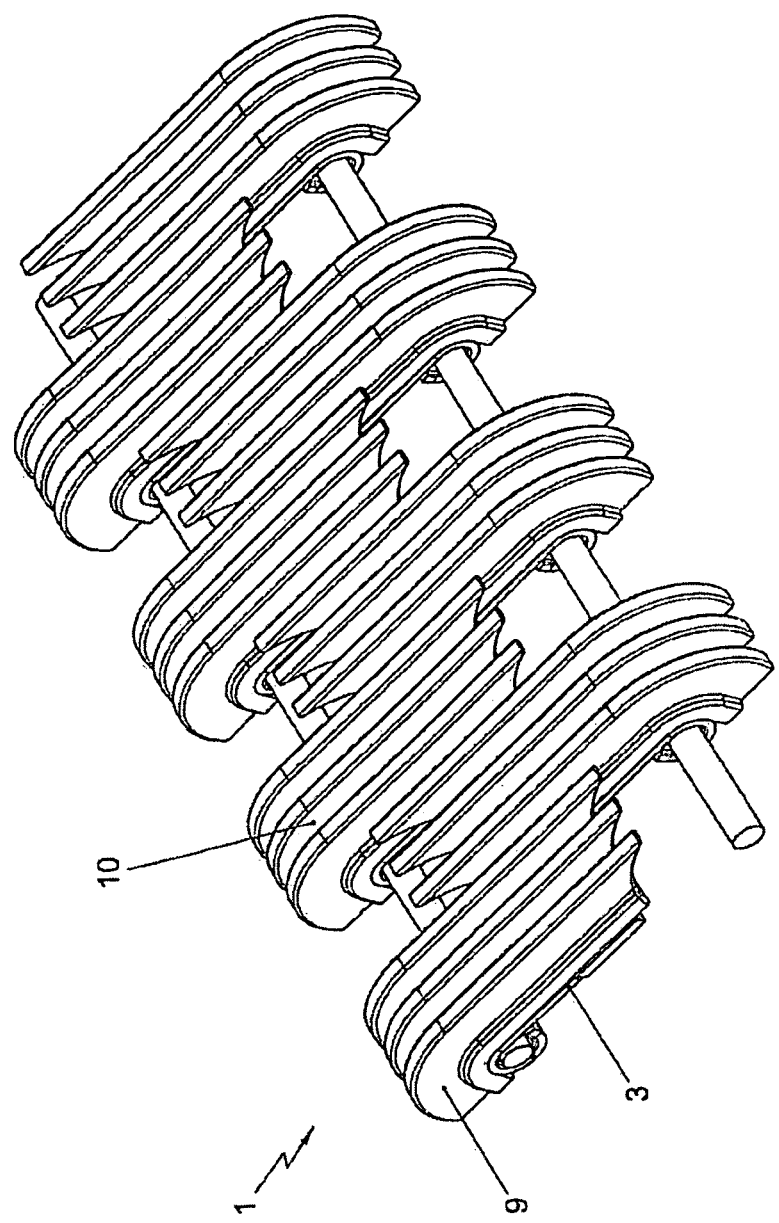
FIG. 5 shows a schematic, perspective top plan view of a second embodiment of a cover for the module of FIG. 1.

The cover comprises a conveying surface 10 for carrying products to be conveyed thereon. The conveying surface 10 is provided with a multiple number of parallel grooves 13 extending in conveying direction P, with supporting strips 14 located therebetween. The supporting strips 14 form the ridges between the grooves 13, and support the products to be conveyed. The grooves 13 are intended for cooperation with fingers of a transferring device as described in, for instance, NL 1 008 070. Upon transfer, the products can be transferred from the supporting strips 14 to ridge parts of the fingers reaching into the grooves 13, for instance when the conveyor mat 2 travels around a returning wheel. Such a transferring device is known to the skilled person and will not be further elucidated here. It may be unnecessary to state here that the width and the cross-section of the grooves can vary. By way of illustration, in FIG. 5, a perspective view is represented of an alternative design of the cover 9, in which the grooves 13 have a different configuration.

The cover 9 substantially covers the body part 3. If desired, the cover 9 can be designed on the body part 3 such that, at least at the conveying surface, the combination corresponds as much as possible with an already existing module 1 of a modular conveyor mat built up from plastic modules. As a result, the modular conveyor mat 2 can be used with as few adaptations as possible in an already existing conveyor track and can cooperate with, for instance, an already existing transferring device.

The cover 9 extends in the conveying direction P beyond the hinge loops 8. As a result, the curvature of the projections of the cover 9 relative to the central axis through the hinge loop 8 may be made the same as the curvature of an already existing, corresponding plastic module.

The cover 9 is provided with drain openings 16 for drainage of liquid through the conveyor mat. The drain openings in the cover and the drain openings 12 in the body part need not necessarily be aligned. Preferably, both in the body part 3 and in the cover, for instance approximately 20% of the surface is openworked.

The cover 9 is laid, substantially fixedly positioned, on the body part 3. In this embodiment, this is realized in that a central part 17 of the cover is connected to the body part 3 in a manner so as to be secured against translation via positioning pins 18 which cooperate with holes 19 arranged in the body part 3. Here, the remaining part of the cover is free to move with respect to the body parts upon thermal length change.

The cover 9 is detachably connected to the body part 3 via a snap connection designed by means of snap fingers 20. The snap fingers can compensate for thermal deformation in conveying direction through bending, and can compensate for the considerably larger thermal deformation transversely to the conveying direction with respect to the body part through shifting.

Therefore, the cover 9 directly engages the body part 3. The cover 9 does not cooperate with the hinge pins 11 and can be detached without disassembly of other parts of the mat being required.

The body part may be provided, transversely to the conveying direction, with a multiple number of covers. For instance, a steel body part 3 with a length transversely to the conveying direction of 12" or 24" can be provided with two or four covers, respectively, of each approximately 6" which have been arranged with small intermediate spaces transversely to the conveying direction. Naturally, it is also possible to provide one body part with one cover, for instance in the case of a 6" module. Adjacent the side edges of the modules 1, transversely to the conveying direction, some intermediate space is left open between the side edge of the cover 21 and the side edge 22 of the body part. Naturally, also, in conveying direction, several covers 9 can be provided when, for instance, a relatively large pitch is opted for.

The module 1 may be driven by having the teeth of a sprocket wheel cooperate with driving surfaces 15 formed by insides of the hinge loops situated under the body part 3. It is, of course, also possible to provide the module 1 with alternative driving surfaces.

The conveying mat 2 comprises a multiple number of modules 1 successive in conveying direction P and extending transversely to the conveying direction. The hinge loops 8 of modules 1 successive in conveying direction P cooperate and are coupled with the aid of hinge pins 11 proceeding transversely to the conveying direction P. The conveying surfaces at the upper sides of the covers 9 cooperate for forming a conveying surface.

The invention is not limited to the exemplary embodiment represented here. Many variations will be clear to the skilled person. In particular, the shape of cover and body part can be specified in highly different manners. Such variations will be clear to the skilled person and are understood to fall within the framework of the invention as set forth in the following claims.

The invention claimed is:

1. A module for a modular conveyor mat, comprising:
   a substantially flat sheet metal body part having a top and a bottom, and provided on front and rear sides extending transversely to a conveying direction with projections spaced apart by intermediate spaces and which form front and rear hinge loops along substantially parallel hinge axes; and
   a plastic cover forming a conveying surface attached to the body part and extending over and around the front and rear hinge loops beyond the bottom of the body part;
   wherein the plastic cover extends beyond a hinge plane passing through the hinge axes.

2. A module according to claim 1, wherein the cover comprising the conveying surface is provided with a multiple number of parallel grooves extending in the conveying direction with supporting strips located therebetween.

3. A module according to claim 1, wherein the cover substantially covers the body part.

4. A module according to claim 1, wherein the cover extends, in the conveying direction, beyond the hinge loops.

5. A module according to claim 1, wherein the cover is laid substantially fixedly positioned on the body part.

6. A module according to claim 1, wherein a central part of the cover is connected to the body part in a manner so as to be secured against translation.

7. A module according to claim 1, wherein the cover is connected to the body part via one or more snap fingers.

8. A module according to claim 1, wherein the cover is connected to the body part via one or more positioning pins.

9. A module according to claim 1, wherein the body part is provided transversely to the conveying direction with a multiple number of covers.

10. A module according to claim 1, wherein the body part is provided with perforations or recesses forming drain openings for drainage of liquid.

11. A module according to claim 1, wherein at least a number of cooperating modules, successive transversely to the conveying direction, link up with each other.

12. A modular conveyor mat, comprising a multiple number of modules, successive in a conveying direction, extending transversely to the conveying direction, the modules having a substantially flat, sheet metal body part defining a top surface and a bottom surface, and that is provided on front sides and rear sides extending transversely to the conveying direction with projections spaced apart by intermediate spaces and which form front and rear hinge loops, and a plastic cover forming a conveying surface attached to the body part and extending over and around the front and rear hinge loops beyond the bottom surface of the body part, wherein the hinge loops of modules successive in the conveying direction cooperate and are coupled with the aid of hinge pins proceeding transversely to the conveying direction, while the upper sides of the covers cooperate for forming a conveying surface.

13. A conveyor mat according to claim 12, wherein successive modules are staggered transversely to the conveying direction, and wherein, in conveying direction, the covers are aligned in rows.

14. A conveyor mat according to claim 12, wherein the cover comprising the conveying surface is provided with a multiple number of parallel grooves extending in the conveying direction.

15. A module for a modular conveyor mat, comprising:
a substantially flat body part having a top surface, a bottom surface, a front side, and a rear side;
front projections extending from the front side of the body part spaced apart by front intermediate spaces and forming front hinge loops;
rear projections extending from the rear side of the body part spaced apart by rear intermediate spaces and forming rear hinge loops; and
a cover forming a conveying surface attached to the body part adjacent to the top surface that extends over and around the front hinge loops and the rear hinge loops beyond the bottom surface of the body part.

16. A module according to claim 15, wherein:
the front hinge loops define a front hinge axis;
the rear hinge loops define a rear hinge axis; and
the cover extends over and around the front hinge loops and the rear hinge loops beyond a hinge plane passing through the front hinge axis and the rear hinge axis.

17. A module according to claim 15, wherein the cover comprising the conveying surface is provided with a multiple number of parallel grooves extending in a conveying direction with supporting strips located therebetween.

18. A module according to claim 15, wherein the cover substantially covers the body part.

19. A module according to claim 15, wherein the cover extends, in a conveying direction, beyond the hinge loops.

20. A module according to claim 15, wherein the cover is laid substantially fixedly positioned on the body part.

21. A module according to claim 15, wherein a central part of the cover is connected to the body part in a manner so as to be secured against translation.

22. A module according to claim 15, wherein the cover is connected to the body part via one or more snap fingers.

23. A module according to claim 15, wherein the cover is connected to the body part via one or more positioning pins.

24. A module according to claim 15, wherein the body part is provided transversely to a conveying direction with a multiple number of covers.

25. A module according to claim 15, wherein the body part is provided with perforations or recesses forming drain openings for drainage of liquid.

26. A module according to claim 15, wherein at least a number of cooperating modules, successive transversely to a conveying direction, link up with each other.

* * * * *

UNITED STATES PATENT AND TRADEMARK OFFICE
CERTIFICATE OF CORRECTION

PATENT NO. : 8,430,235 B2  Page 1 of 1
APPLICATION NO. : 12/096136
DATED : April 30, 2013
INVENTOR(S) : Menke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this
Eighth Day of September, 2015

Michelle K. Lee
*Director of the United States Patent and Trademark Office*